(12) United States Patent
Murray et al.

(10) Patent No.: US 9,291,336 B2
(45) Date of Patent: Mar. 22, 2016

(54) CHANDELIER WITH COUNTERWEIGHT HEIGHT ADJUSTMENT SYSTEM

(71) Applicant: Neuehouse LLC, New York, NY (US)

(72) Inventors: Alan Murray, New York, NY (US);
Cristina Azario, New York, NY (US);
Nicholas Thatos, Manhasset, NY (US);
Michael Siporin, New York, NY (US);
David Rockwell, New York, NY (US)

( * ) Notice: Subject to any disclaimer, the term of this patent is extended or adjusted under 35 U.S.C. 154(b) by 8 days.

(21) Appl. No.: 14/266,182

(22) Filed: Apr. 30, 2014

(65) Prior Publication Data

US 2015/0316240 A1 Nov. 5, 2015

(51) Int. Cl.
*A47H 1/10* (2006.01)
*F21V 21/18* (2006.01)
*F16M 13/02* (2006.01)

(52) U.S. Cl.
CPC .............. *F21V 21/18* (2013.01); *F16M 13/022* (2013.01); *F16M 13/027* (2013.01)

(58) Field of Classification Search
CPC ..... F21V 21/18; F16M 13/027; F16M 13/022
USPC ........................................................ 248/331
See application file for complete search history.

(56) References Cited

U.S. PATENT DOCUMENTS

| | | | |
|---|---|---|---|
| 151,083 A | 5/1874 | Buck | |
| 759,904 A | 5/1904 | Moy et al. | |
| 875,280 A | 12/1907 | McGavin | |
| 921,520 A | 5/1909 | Dodge et al. | |
| 971,899 A | 10/1910 | Kennedy | |
| 1,055,020 A * | 3/1913 | Camph | 362/401 |
| 1,069,295 A | 8/1913 | Sage et al. | |
| 1,510,399 A | 9/1924 | Hauck | |
| 1,631,488 A | 6/1927 | Jones | |
| 2,926,865 A | 3/1960 | Humphreys | |
| 3,345,066 A | 10/1967 | Izenour | |

(Continued)

FOREIGN PATENT DOCUMENTS

CN 2823816 Y 10/2006
DE 4401574 A1 7/1995

OTHER PUBLICATIONS

International Search Report dated Aug. 5, 2015 from PCT/US2015/28302.

*Primary Examiner* — Mark Wendell
(74) *Attorney, Agent, or Firm* — Brad M. Behar & Associates, PLLC

(57) ABSTRACT

The present invention is a chandelier with a height adjustment system comprising a counterweight located within a pair of vertically positioned rails connected to a chandelier by two wires corrected to the top of the counterweight on one end and to the chandelier at the other. The counterweight is configured (weighted) such that it is close in weight to the chandelier such that the chandelier can be easily raised or lowered by moving the counterweight by hand down or up within the vertical rails. The pair of wires traverse up between the vertical rails over a first pair of pivoting pulleys located above the counterweight. The pair of wires further traverse over a second pair of pivoting pulleys located above the chandelier and then down to the top of the chandelier where each of the wires are connected. A spring loaded power cord reel capable of retracting and unrolling a power cord connected to the electrical wiring on the chandelier and to an electrical junction box above is positioned in between the second pair of pulleys.

7 Claims, 16 Drawing Sheets

(56) References Cited

U.S. PATENT DOCUMENTS

| | | |
|---|---|---|
| 3,514,586 A | 5/1970 | Kuebler |
| 3,686,498 A | 8/1972 | Meyer |
| 3,958,116 A | 5/1976 | Jones |
| 4,358,817 A | 11/1982 | Bielemeier |
| 5,711,713 A | 1/1998 | Krueger |
| 5,996,970 A | 12/1999 | Auerbach |
| 6,312,139 B1 * | 11/2001 | Baker et al. .................. 362/145 |
| 7,264,227 B2 | 9/2007 | Miller et al. |
| 7,475,512 B2 * | 1/2009 | Van Den Dool .................. 47/17 |
| 7,854,616 B2 | 12/2010 | Janos et al. |
| 2007/0134093 A1 | 6/2007 | Weiler |
| 2010/0107320 A1 * | 5/2010 | Rees .................. 2/456 |
| 2010/0258699 A1 | 10/2010 | Boychuk et al. |
| 2014/0036517 A1 | 2/2014 | Machiorlette |

\* cited by examiner

CHANDELIER WITH COUNTERWEIGHT HEIGHT ADJUSTMENT SYSTEM

FIELD OF THE INVENTION

The present invention relates to lighting systems and fixtures. More specifically, the present invention relates to an adjustable height electrical chandelier light. The invention further relates to a sliding counterweight and rail system with pivoting pulleys as well as retractable electrical power cord devices.

BACKGROUND OF THE INVENTION

Chandeliers and other lighting fixtures add style and sophistication to a room. They also provide necessary lighting, whether it is in a home, office, commercial or retail establishment, etc. Chandeliers can range in appearance from simple to ornate and often include various arms for light bulbs or candles. Many chandeliers are mounted to the ceiling and attached to junction boxes containing electrical wires to which the wires for the chandelier are attached. As a result of the height of the fixture, in order to change a light bulb or to clean the fixture one must climb a ladder which could be dangerous and/or result in an injury.

To address these issues, some have come up with ways to lower a chandelier from its mounting location thereby allowing for the maintenance at a level close to the floor. Some chandeliers can be lowered with a motorized mechanism located in the ceiling above the electrical junction box. One of the main disadvantages to these types of devices is that use requires shutting off the power to the chandelier prior to lowering. For chandeliers with many light bulbs, the lack of power sometimes makes it difficult to identify which light bulb needs to be replaced when the chandelier is lowered. In addition, the motor for raising and lowering the chandelier may need to be replaced during the lifetime of the chandelier, which can be inconvenient and costly. Another disadvantage to these motorized devices is that the user cannot use them to raise or lower the chandelier to a desired height above the floor with the ability to turn the chandelier on and keep it on at that height.

Some chandeliers and light fixtures, for example in theaters, can be raised and lowered with or without a motor and the electrical connection remains intact and thus the light bulbs remains operable. Such systems typically utilize pulleys to help raise and lower the chandelier over the stage area from a remote position on the side of the stage. To help operators with the raising and lowering of such light fixtures, some of these systems and devices utilize one or multiple counterweights located on the operator side which make it easier to move the light fixture. One of the main disadvantages with these types of systems/device is that they can be bulky in appearance and take up a significant amount of space.

It is desirable to provide a chandelier and a chandelier lowering system that is easily adjustable for operation at any height below a ceiling, easy to maintain and attractive. It is desirable to have a chandelier that can be mounted in any location in a room with a height adjustment system attached to a close by wall. There is a desire for a chandelier and chandelier raising/lowering system that is attractive and that can be easily and safely raised and lowered for various reasons including mood lighting, changing light bulbs, and for cleaning. There is a need for a chandelier and chandelier raising/lowering system that can be easily and safely raised and lowered without need to adjust or unplug electrical cords and without worry about a tangling of the electrical cord(s).

SUMMARY OF THE INVENTION

Applicants have invented a chandelier with a height adjustment system that overcomes these and other shortcomings. While the invention will be described in connection with certain embodiments, it will be understood that the invention is not limited to those embodiments. To the contrary, the invention includes all alternatives, modifications and equivalents as may be included within the spirit and scope of the present invention.

Applicant has invented a chandelier with a height adjustment system comprising a counterweight located within a pair of vertically positioned rails connected to a chandelier by two wires corrected to the top of the counterweight on one end and to the chandelier at the other. The counterweight is sized (weighted) such that it is close in weight to the chandelier such that the chandelier can be easily raised or lowered by moving the counterweight by hand down or up within the vertical rails. The pair of wires traverse up between the vertical rails over a first pair of pivoting pulleys located above the counterweight. The pair of wires further traverse over a second pair of pivoting pulleys located above the chandelier and then down to the top of the chandelier where each of the wires are connected. A spring loaded power cord reel capable of retracting and unrolling a power cord connected to the electrical wiring on the chandelier and to an electrical junction box above is positioned in between the second pair of pulleys. The chandelier with a height adjustment system according to the invention provides for mounting of the counterweight and rails on a wall at any distance from the chandelier and at any angular position relative to the chandelier.

The chandelier according to the present invention can be raised and lowered with the lights on and without worry about kinking or tangling of the electrical power cord. The chandelier according to the present invention can be positioned in the middle of a room with the accompanying counterweight and rails positioned on any wall in the room. The pivoting capability of the pairs of pulley allows for positioning of the chandelier perpendicular to the wall on which the counterweight and rails are mounted as well as other angular locations relative to such wall. The invention also includes other embodiments where the counterweight and rails are not mounted on a wall but instead are supported by a floor and ceiling off a wall.

The chandelier can be of any design provided there are two connection points on the chandelier for attachment of the pair of wires.

Preferably, the counterweight is held in the desired position between the rails with a locking mechanism which could include a pin placed through an aperture in a rail, a lockable gear on the rail, a locking wrench placed on the rail to stop the counterweight from sliding up and/or down, and the like. Most preferably, each of the rails include a plurality of apertures at varying locations along the length of the rail to provide the ability to secure the counterweight and thus position the chandelier at any height above the floor and below the ceiling.

The chandelier according to the present invention can be raised and lowered with the lights on and without manual adjustment of the power cord.

BRIEF DESCRIPTION OF THE DRAWINGS

The accompanying drawings, which are incorporated in and constitute a part of this specification, illustrate embodiments of the invention and, together with the general description of the invention given above and the detailed description of an embodiment given below, serve to explain the principles of the present invention. Similar components of the devices are similarly numbered for simplicity.

FIG. 8 is a close up view of the rails and wall brackets.

FIG. 9 is a close up view of the counterweight and rails near the floor showing the counterweight in a set position off of the floor and also showing the floor bracket and wall bracket. FIG. 9 also shows the plurality of apertures in the rails and the apertures in the counterweight for connection to the wires using carabiners.

FIG. 10 is another view of a portion of the device shown in FIG. 9.

FIG. 11 is a close up view of the first set or roller pulleys located above the counterweight in an angled position with the wires around the pulleys.

FIG. 12 is a close up view of the first set or roller pulleys shown in FIG. 11.

FIG. 13 shows the second pair of roller pulleys with the power cord reel between them.

FIG. 14 is a close up view of the second pair of roller pulleys with the power cord reel between them with a power junction box above.

FIGS. 15 and 16 show a chandelier supported below the second pair of roller pulleys.

DETAILED DESCRIPTION OF THE INVENTION

Reference is being made in detail to presently preferred embodiments of the invention. Selective embodiments are provided by way of explanation of the invention, which is not intended to be limited thereto. In fact, those of ordinary skill in the art may appreciate upon reading the present specification and viewing the present drawings that various modifications and variations can be made.

FIGS. 1 through 6 show several views of a chandelier according to one embodiment of the invention with two levels of globes and light bulbs, a first upper level containing twelve light fixtures and a second lower level containing six light fixtures. The chandelier includes a cylindrical shroud near the top of the chandelier with three wires extending from the shroud to the support ring for the second lower level of fixtures.

The present invention is not limited to the single chandelier design shown here but includes other designs and configurations with more or less bulbs/fixtures and other shapes.

Figure 1:
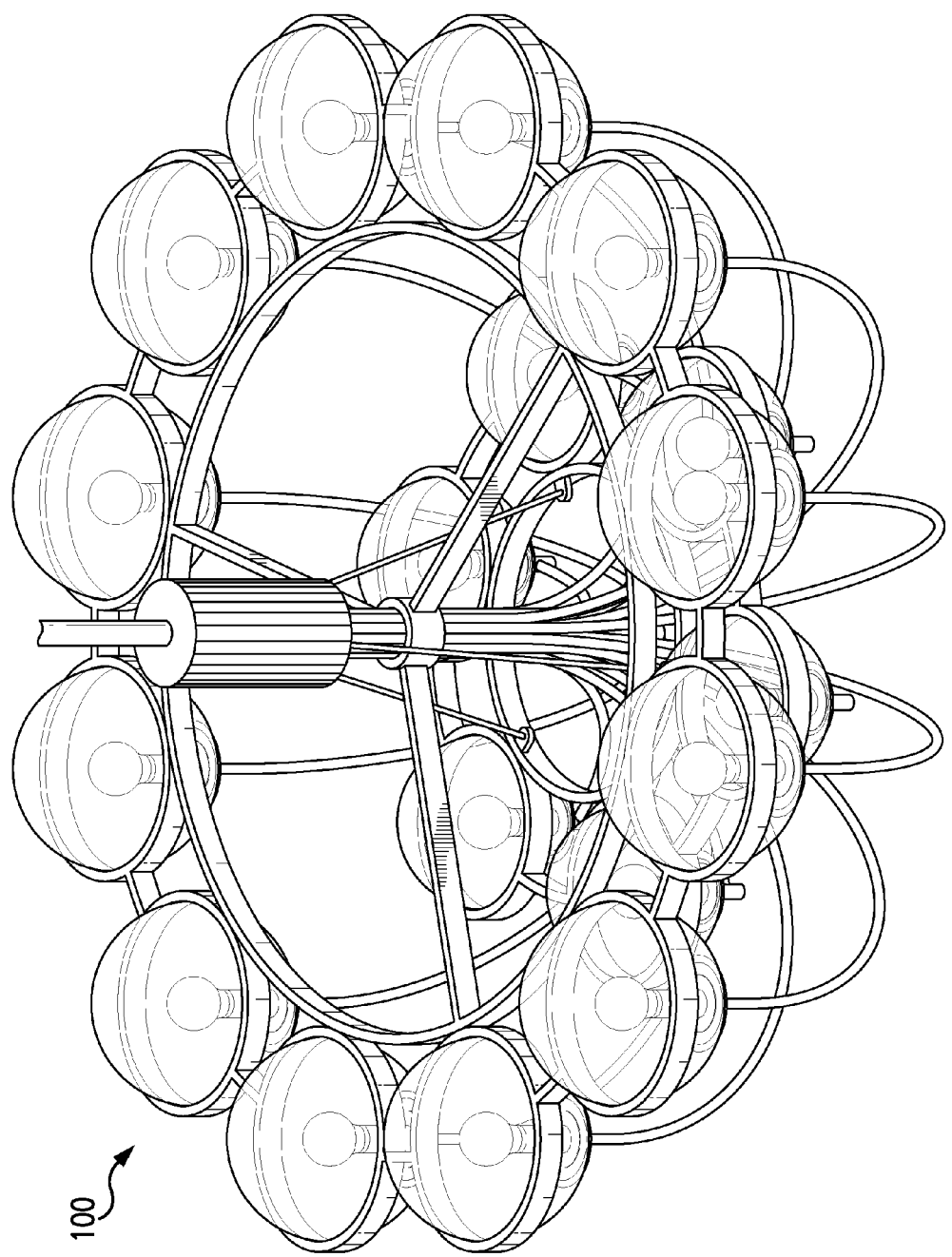
FIG. 1 is a front upper perspective view of a chandelier according to one embodiment of the invention with two levels of globes and light bulbs, a first upper level containing twelve light fixtures and a second lower level containing six light fixtures.
Figure 2:
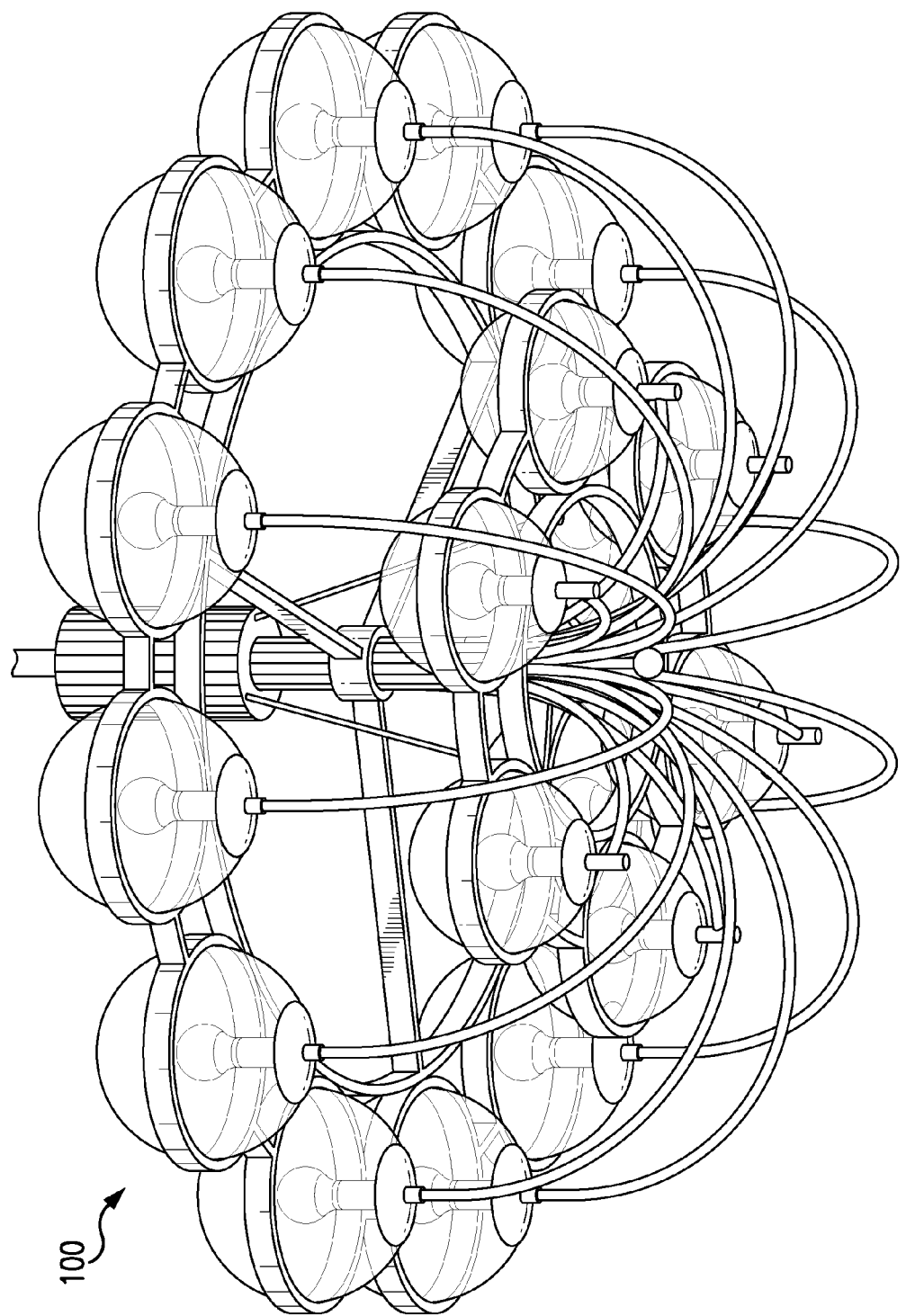
FIG. 2 is a lower perspective view of the chandelier shown in FIG. 1.
Figure 3:
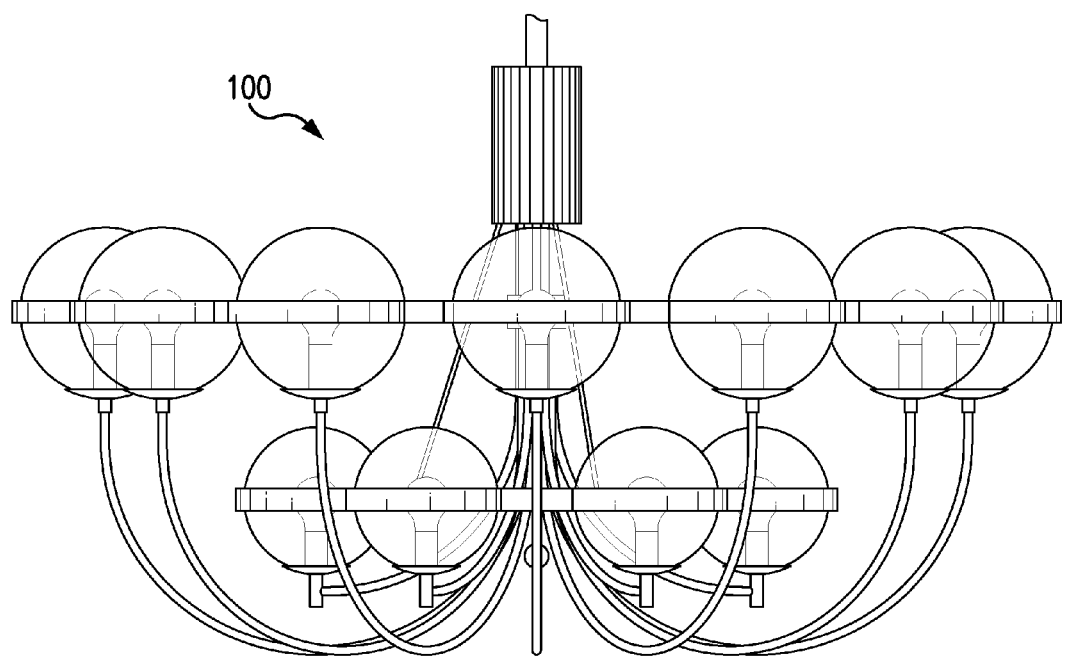
FIG. 3 is a front view of the chandelier shown in FIG. 1.
Figure 4:
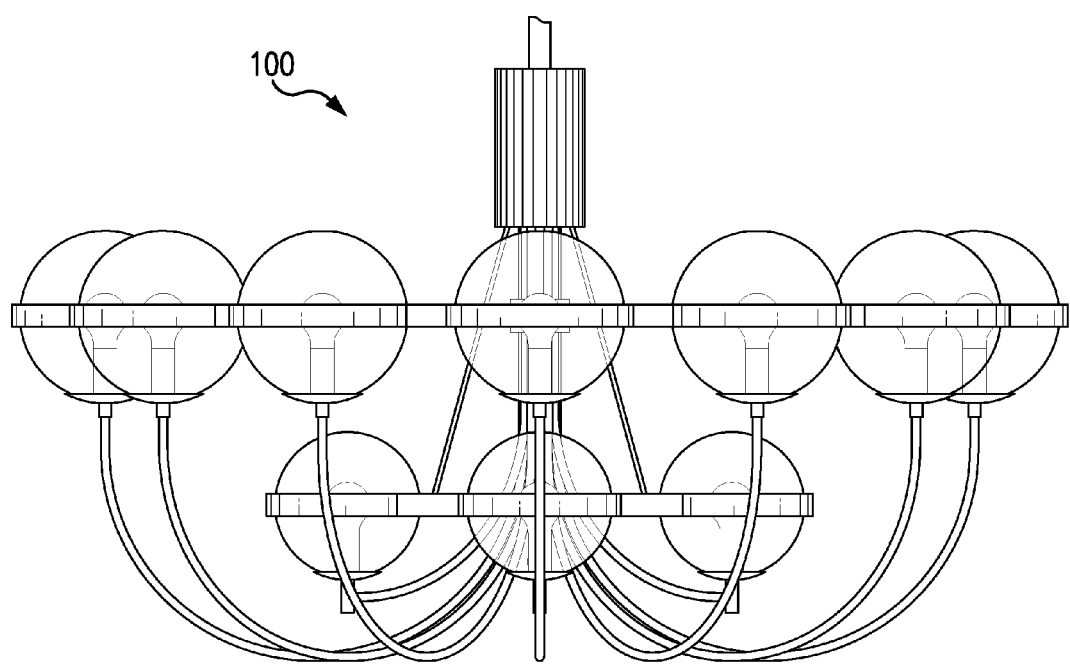
FIG. 4 is a rear view of the chandelier shown in FIG. 1.
Figure 5:
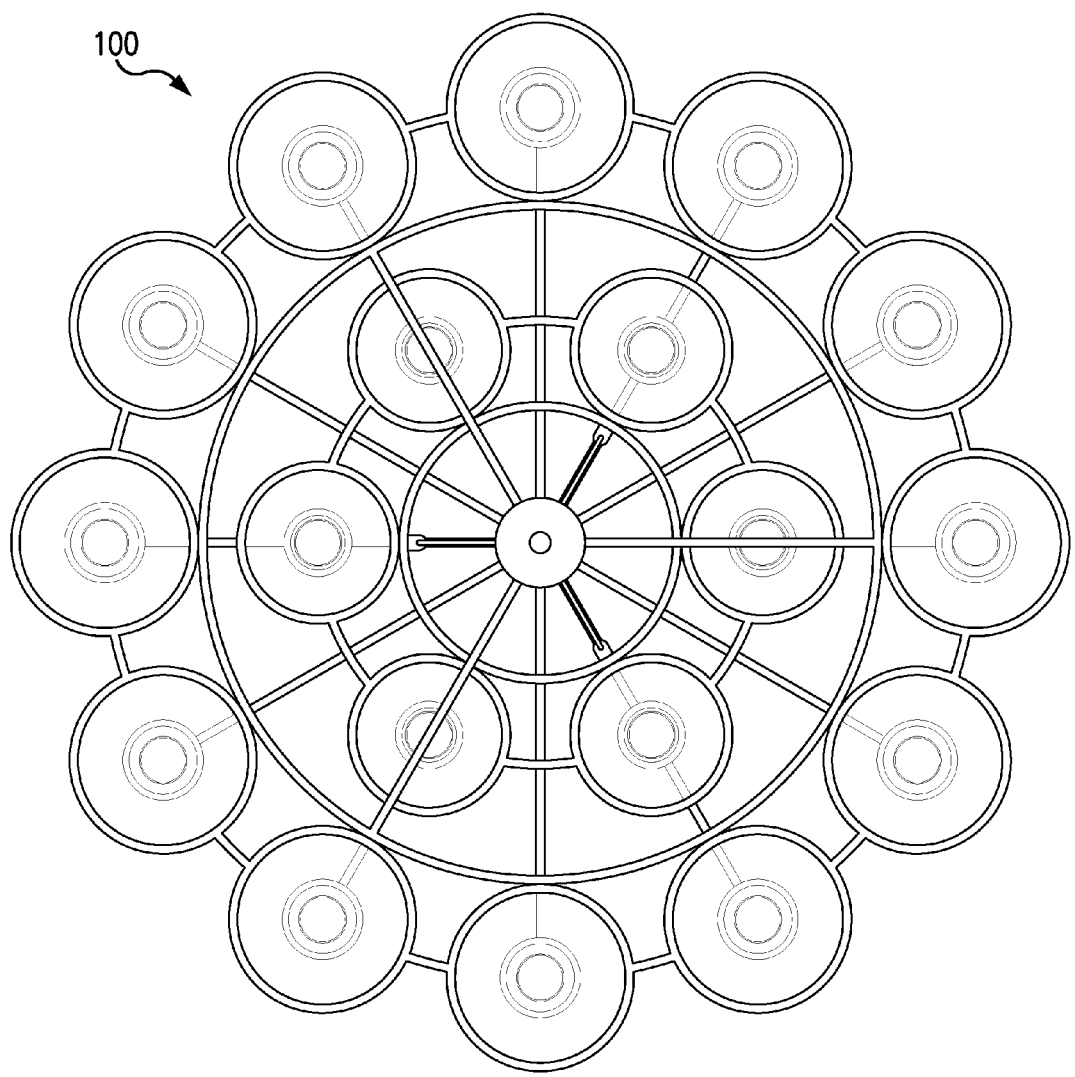
FIG. 5 is a top view of the chandelier shown in FIG. 1.
Figure 6:
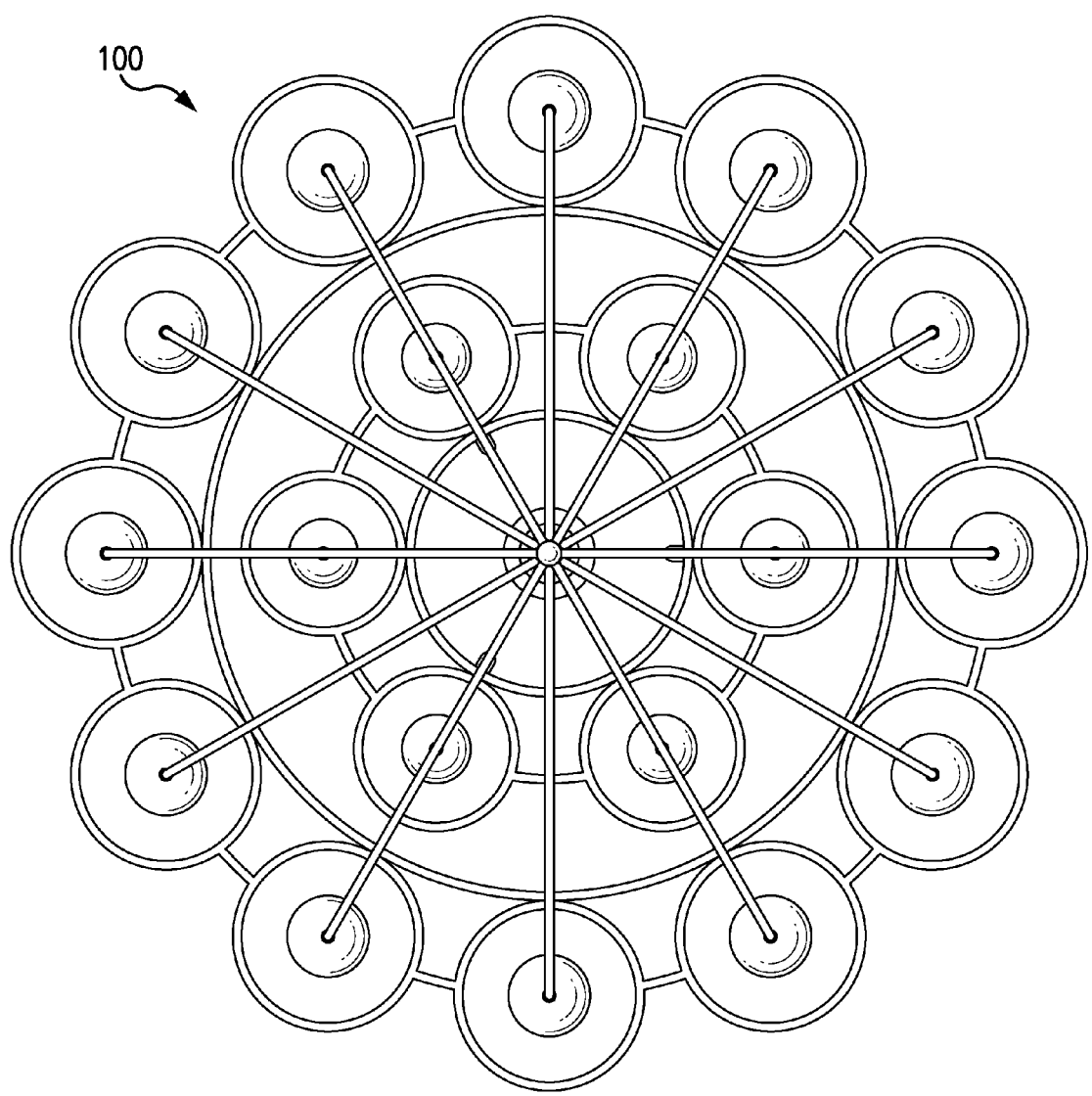
FIG. 6 is a bottom view of the chandelier shown in FIG. 1.
Figure 7:
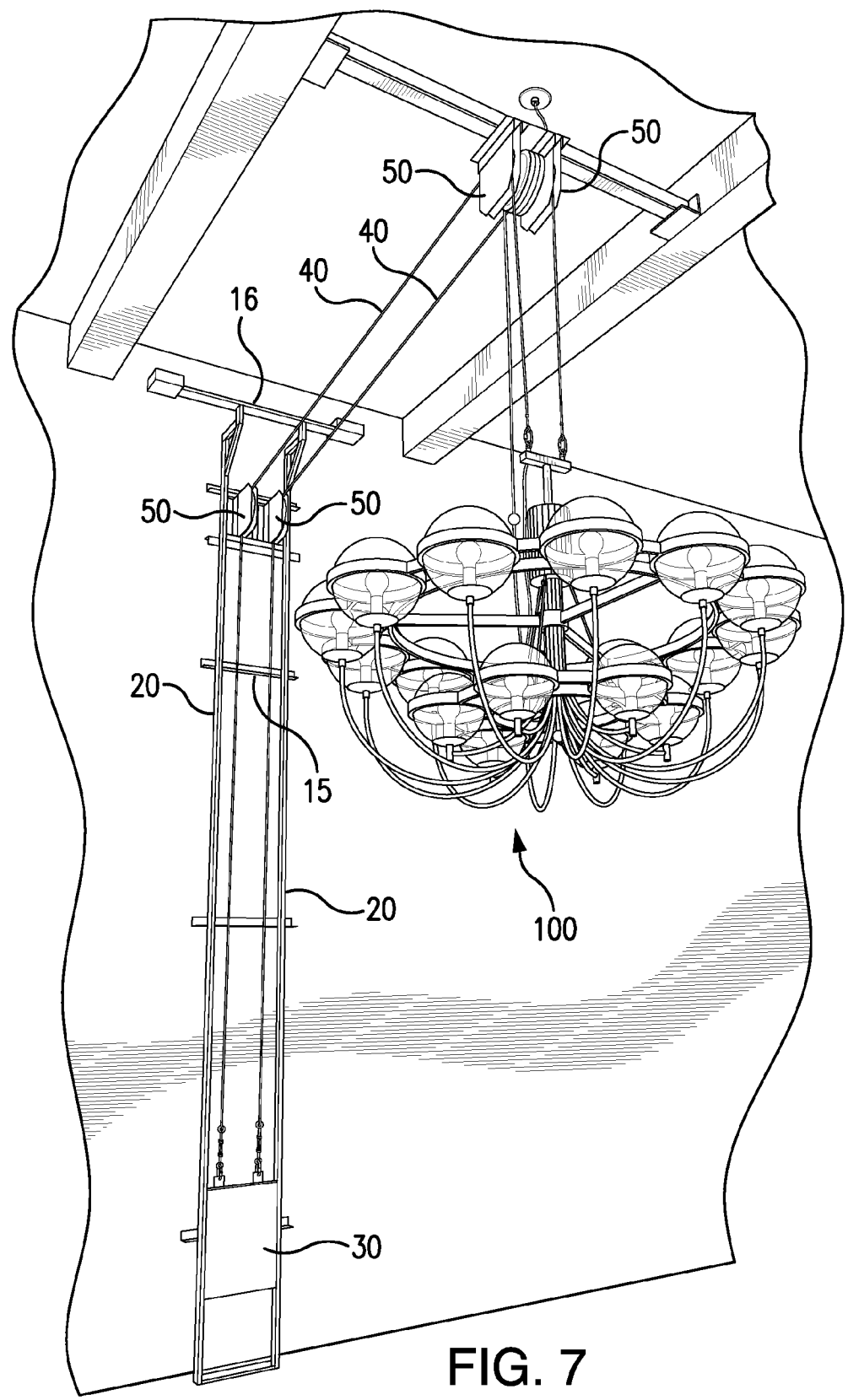
FIGS. 7 through 16 show one embodiment of the invention comprising a chandelier having a dual wire connection tee at the top with power wiring centrally positioned, two wires connected to the top of the chandelier at one of their ends and to a counterweight at their other ends, the wires positioned over two pair of roller pulleys one pair located above the chandelier and another pair located above the counterweight.
Figure 8:
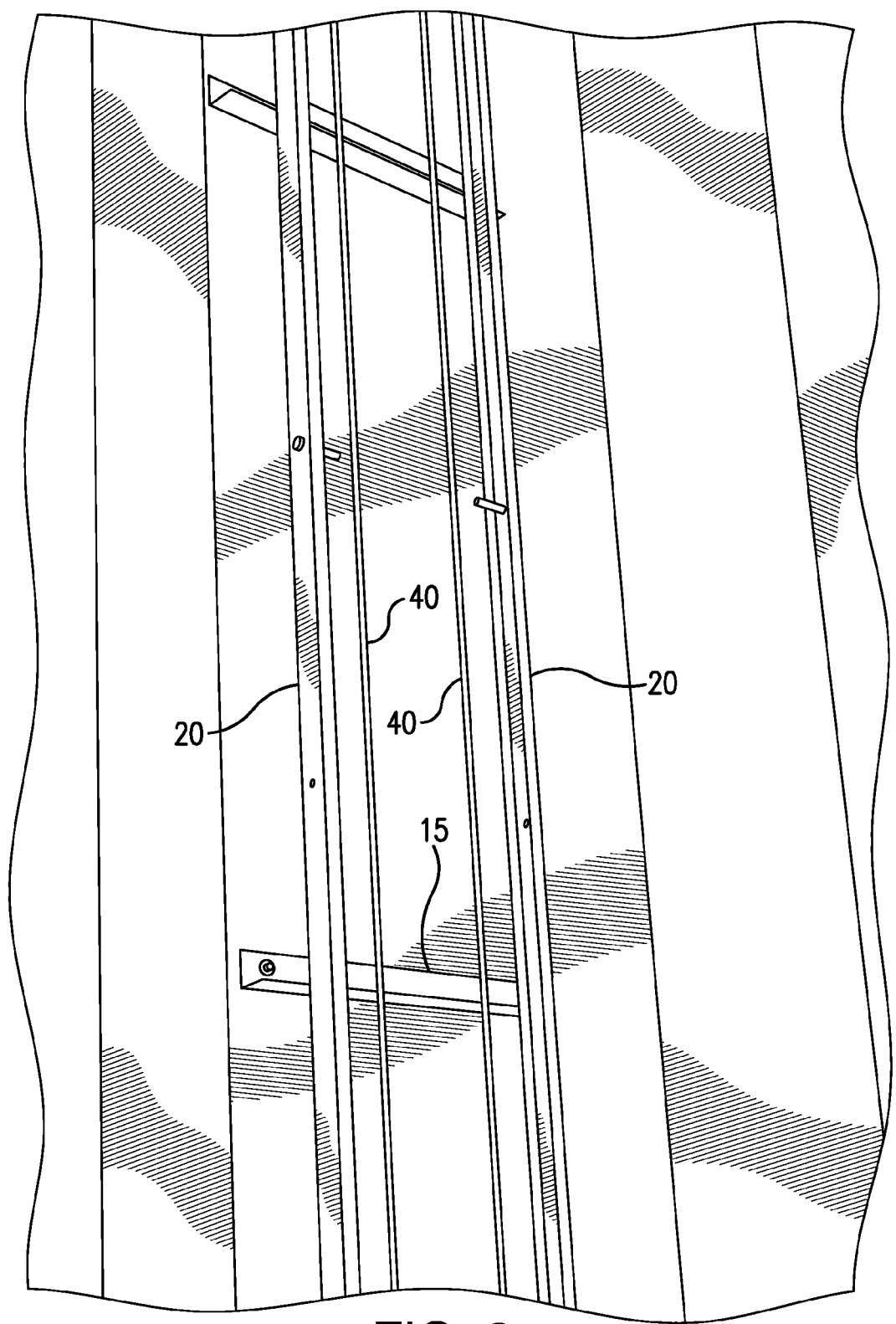
Figure 9:
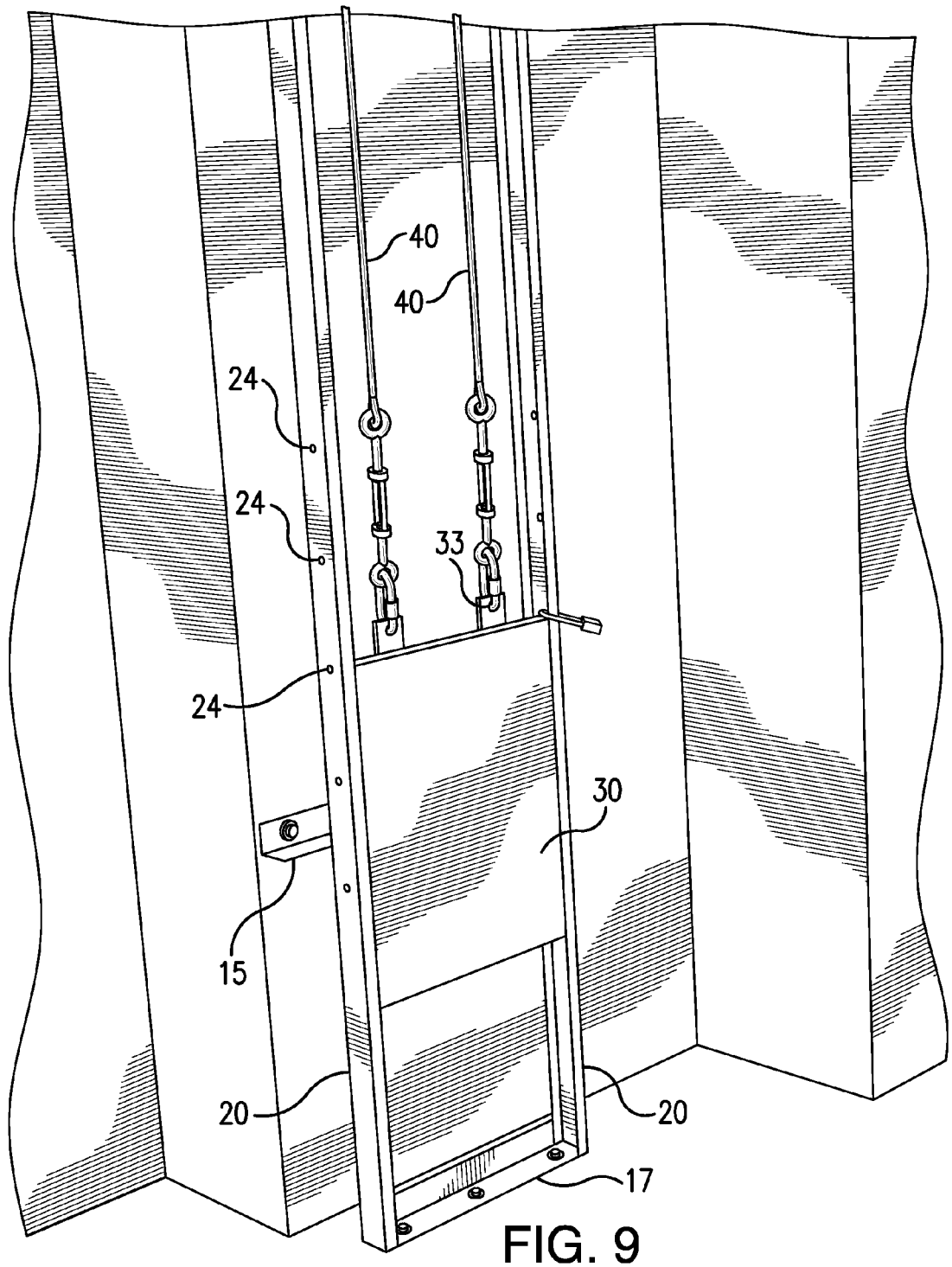
Figure 10:
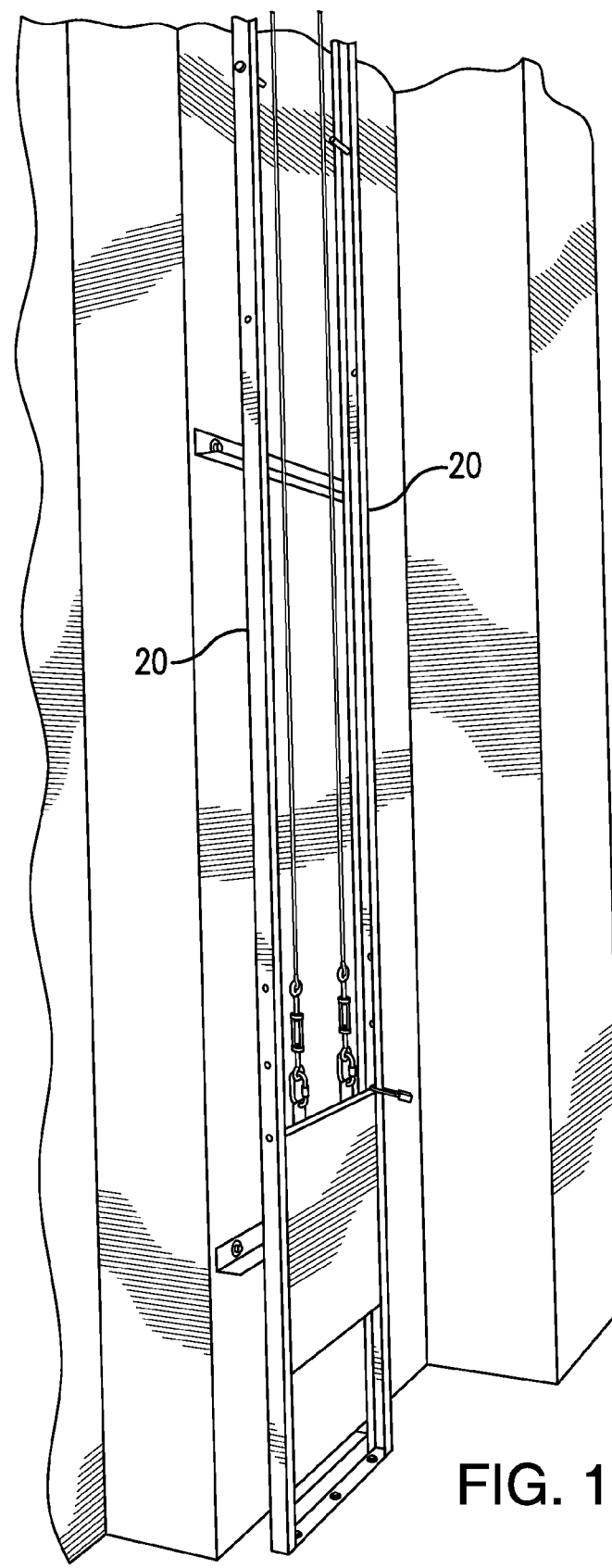
Figure 11:
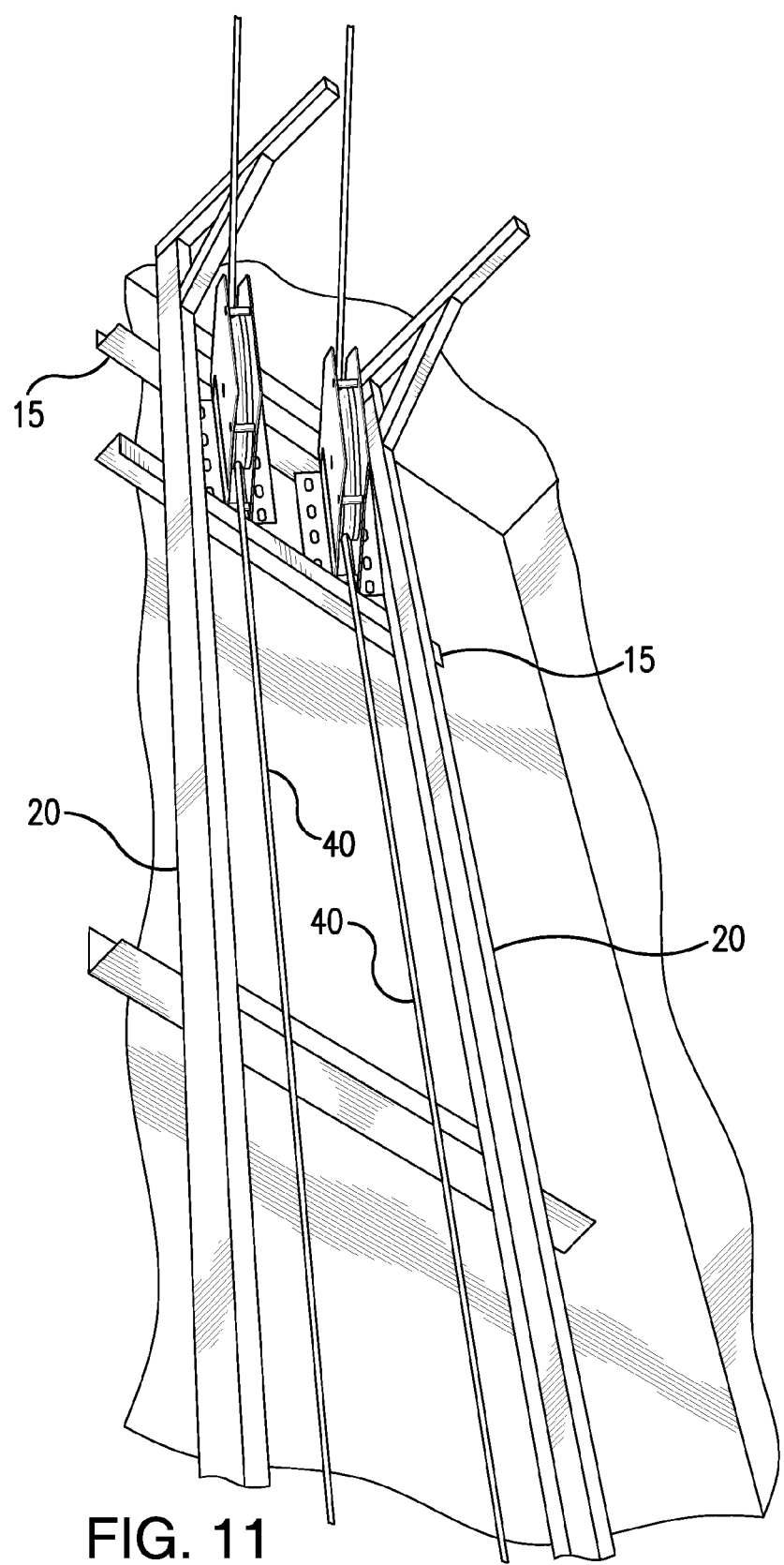
Figure 12:
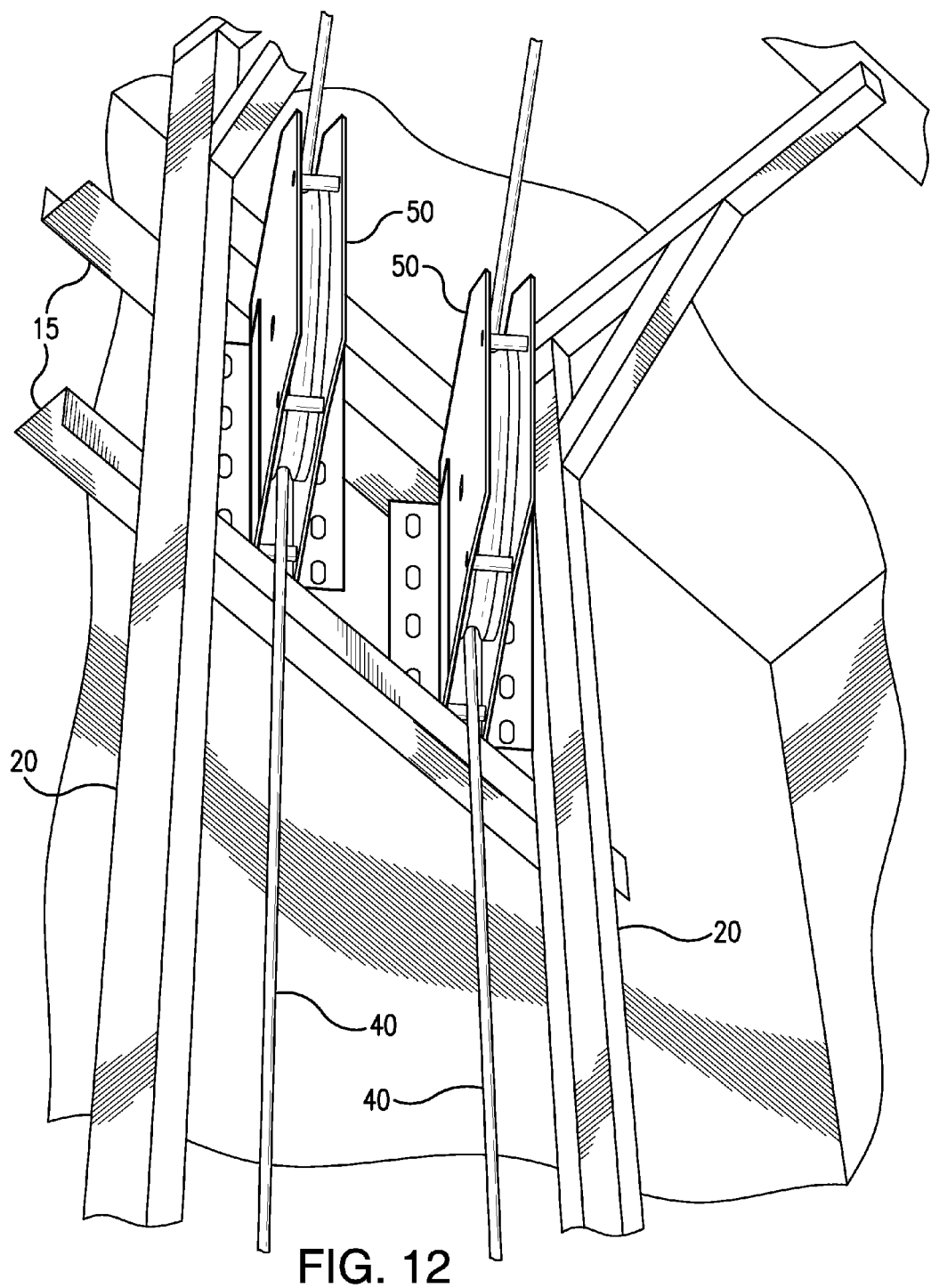

FIGS. 7 through 16 show an embodiment of the chandelier support system according to the invention comprising a pair of parallel rails 20 with a counterweight 30 located between the pair of rails 20. The cross sectional shape of each rail 20 is configured to slidably connect to the sides of the counterweight 30 and maintain the counterweight 30 between the rails 20. For example, the cross sectional shape of the rails 20 could be U-channels or C-channels with the sides of a metal counterweight sliding within the channels or the rails 20 could be T-shaped metal where the T portion is configured to slide in a groove located on each side of the counterweight 30. Counterweight 30 is capable of sliding along the length of the rails between the rails. The rails could be connected to a wall using wall brackets 15 as shown in the figures and/or the rails could be supported away from a wall with supports located on the floor and ceiling. A ceiling bracket 16 connecting the rails 20 to the ceiling is shown in FIG. 7. A floor bracket connecting the rails to the floor is shown in FIG. 9.

The invention further includes two wires 40 connected to the top of the counterweight 30 either directly through apertures 33 in the counterweight 30 or indirectly using fastening clips, clasps or carabiners (as shown in FIG. 9) which connect to the wires 40 and also connect to the counterweight 30.

The chandelier support system according to the invention furthermore comprises two pairs of roller pulleys 50, a first pair and a second pair. The first pair of roller pulleys 50 are located above the counterweight between the rails 20, preferably near the tops of the rails 20 and the second pair of roller pulleys 50 are located above the location where the chandelier 100 is to be positioned. Each roller pulley 50 is pivotally mounted between the rails 20. The pivoting ability can be accomplished using a pinned mount for the pulleys 50 on the wall brackets as shown, for example, in FIGS. 11 and 12. The pulleys 50 are capable of rotating so that the chandelier can be mounted at an angle to the plane created by the rails 20 which could also be a close by wall.

The two wires 40 connected to the counterweight 30 at one end are each positioned over one of the first pair of roller pulleys 50 located above the counterweight, then over one of the second pair of roller pulleys 50 located above the chandelier 100 and then connected at their other ends to the top of the chandelier 100. Preferably, the spacing between the pulleys 50 in each of the first pair and the second pair are about equal to keep the wires 40 parallel between the ends of the wires 40.

Figure 13:
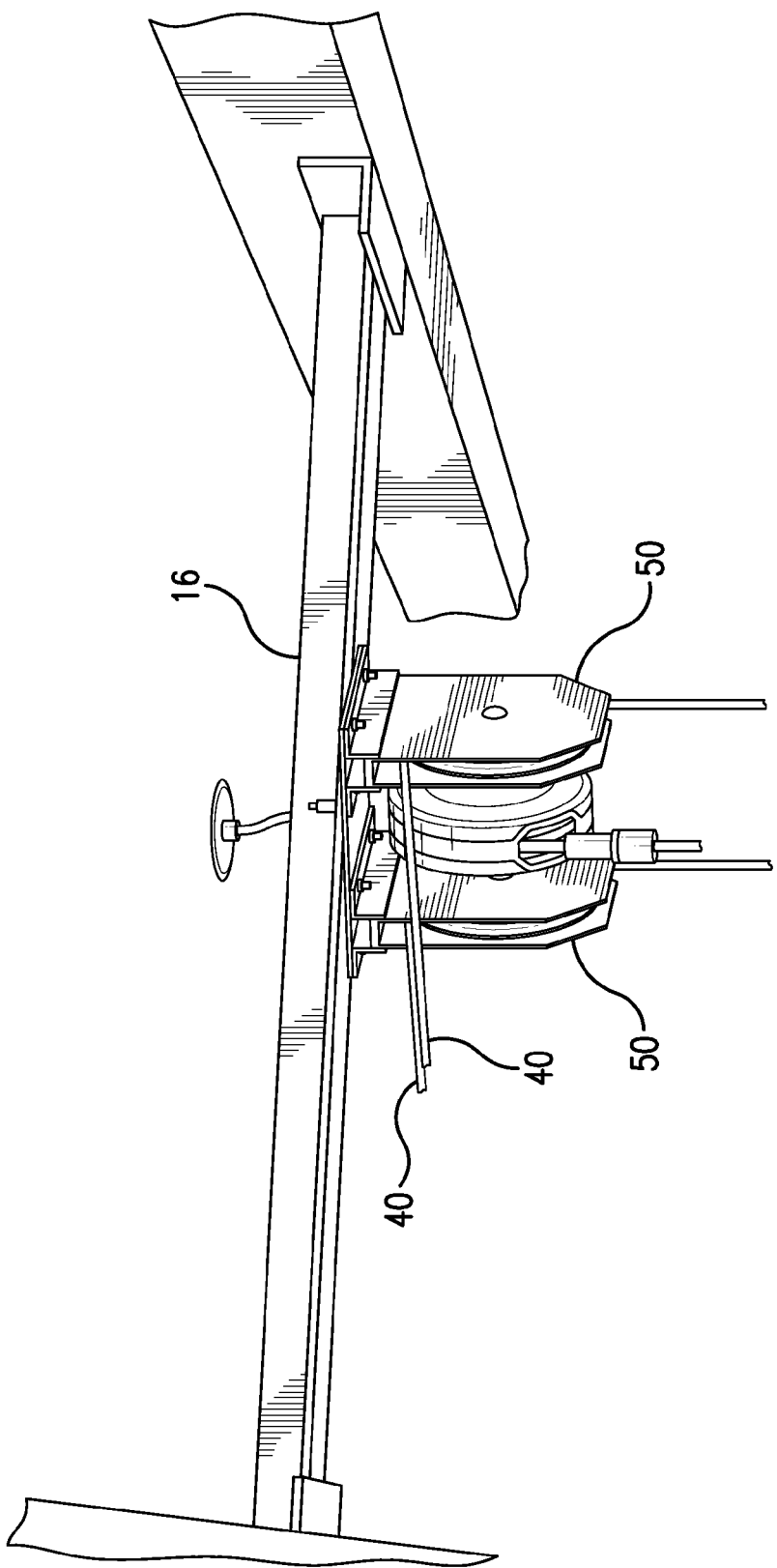
Figure 14:
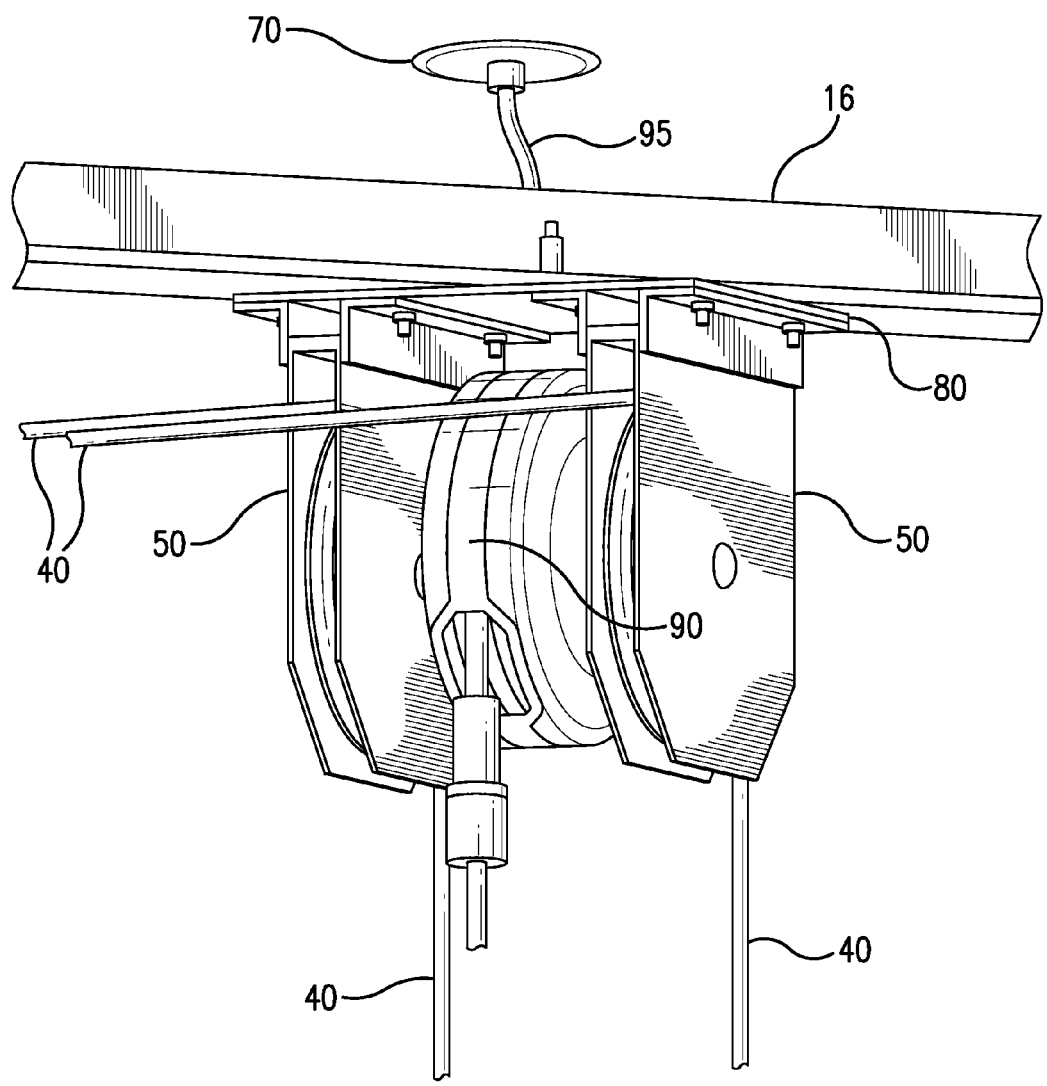
Figure 15:
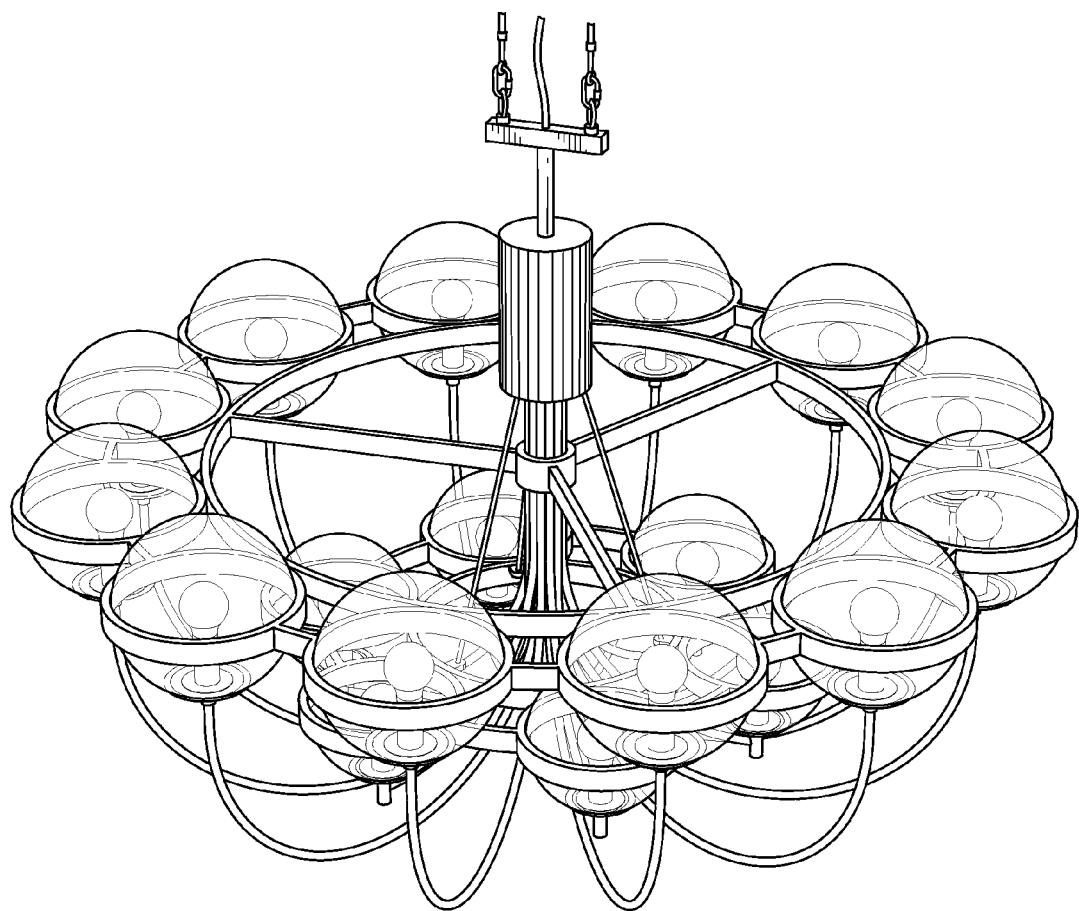
Figure 16:
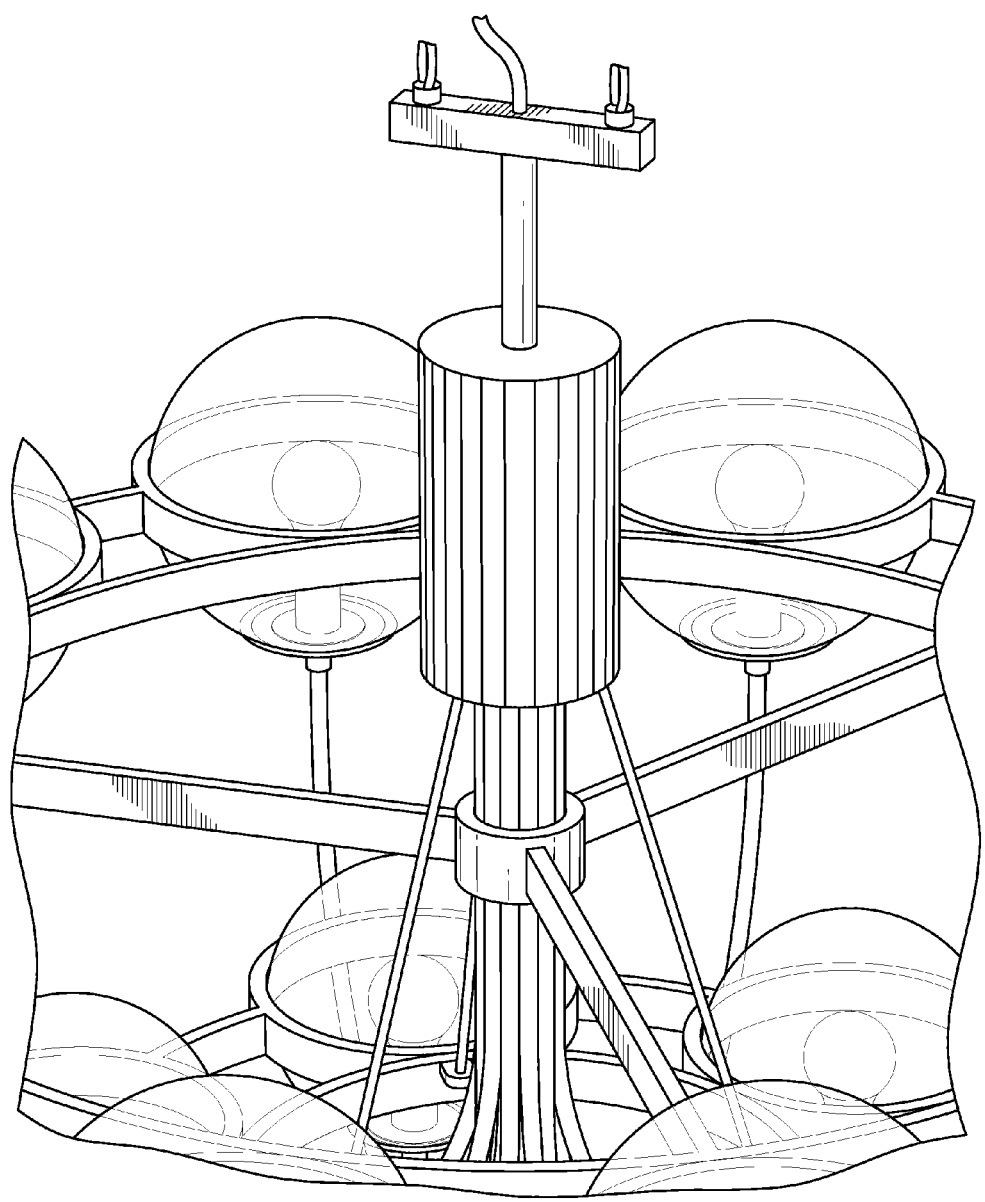

The second pair of roller pulleys 50 located above the chandelier can be individually and pivotally mounted to the ceiling above the chandelier 100 using a ceiling support. Alternatively, as shown in FIGS. 13 and 14, the second pair of roller pulleys 50 could be mounted to a single plate 80 which in turn is pivotally mounted to a ceiling mount bracket 16.

Preferably, the electrical junction box with wiring supplying power to the chandelier is located near the second pair of roller pulleys 50. Most preferably, the electrical junction box 70 is located directly above the second pair of roller pulleys 50. for a clean appearance as shown in FIG. 14.

In between the second pair of roller pulleys 50 is a spring loaded power cord reel 90. The power cord reel 90 need not be mounted in between second pair of roller pulleys 50 and could be mounted in other locations if the chandelier's 100 wiring is offset from the center of the chandelier. The power cord reel 90 includes a power cord 95 connected at one end to the wiring in the electrical junction box 70 and the wiring for the chandelier 100 at the other end. The power cord 95 unwinds as needed when the chandelier 100 is lowered and winds back onto the reel 90 when the chandelier 100 is raised due to the mechanical spring in the reel.

A plurality of apertures 24 are positioned on one or both of the rails 20 as shown in FIG. 9. The plurality of apertures 24 are positioned at varying heights on the rails 20 above the floor such that a pin, bolt, or lock can be placed through an aperture to hold the counterweight 30 and thus the chandelier 100 at a set and desired height. The height of the chandelier can be altered by removing the pin, bolt or lock, sliding the counterweight 30 to another height/position between the rails 20 and then placing the pin, bolt or lock into a new aperture to prevent the counterweight from sliding up or down. In an alternative embodiment, the pin, bolt or lock could also be placed through an aperture in the counterweight 30.

Two wires provide redundancy and a safety for the device. For example, if a wire or connector unexpectedly fails and brakes, while the chandelier 100 may tilt it will remain supported and will not fall. Accordingly, the invention is not limited to systems with only two wires 40 and pairs of roller pulleys 50 but also includes three and more wires with three and more roller pulleys at each position above the counterweight 30 and chandelier 100.

We claim:

1. A chandelier support system comprising:
   a counterweight slidably connected to a pair of vertically positioned rails, said rails parallel to each other, said counterweight positioned between said rails;
   two wires connected to the top of said counterweight, said two wires positioned over a first pair of roller pulleys located above said counterweight, said two wires also positioned over a second pair of pulleys located above a chandelier, said first pair of pulleys pivotally mounted between said rails, said second pair of pulleys pivotally positioned above said chandelier;
   a spring loaded power cord reel located between said second pair of pulleys, wherein a power cord unwinds off said reel when said chandelier is lowered and winds onto said reel when said chandelier is raised;
   a plurality of apertures on each said rails, wherein the position of the counterweight can be fixed by placing a pin or lock in one of said apertures thereby preventing the counterweight from sliding up or down between said rails.

2. The device according to claim 1, further comprising a plurality of wall brackets fixedly connected to said rails, said wall brackets comprising apertures for fixedly attaching said plurality of wall brackets to a wall.

3. The device according to claim 1, wherein said spring loaded power cord reel is pivotally mounted between said second pair of pulleys.

4. A chandelier support system comprising:
   a counterweight slidably connected to a pair of vertically positioned rails, said rails parallel to each other, said counterweight positioned between said rails;
   two wires connected to the top of said counterweight, said two wires positioned over a first pair of roller pulleys located directly above said counterweight, said two wires also positioned over a second pair of pulleys located directly above a chandelier, said first pair of pulleys pivotally mounted between said rails, said second pair of pulleys pivotally positioned above said chandelier;
   a spring loaded power cord reel fixedly connected to said second pair of pulleys in between said second pair of pulleys, wherein a power cord unwinds off said reel when said chandelier is lowered and winds onto said reel when said chandelier is raised; and
   a plurality of apertures in said rails, wherein the position of the counterweight can be fixed by placing a pin or lock in one of said apertures thereby preventing the counterweight from sliding up or down between said rails.

5. The device according to claim 4, further comprising a plurality of wall brackets fixedly connected to said rails, said wall brackets comprising apertures for fixedly attaching said plurality of wall brackets to a wall.

6. A chandelier and chandelier support system comprising:
   a chandelier comprising a T-shaped support bar at a top of said chandelier, said T-shaped support bar comprising two chain link connectors on a top;
   a counterweight slidably connected to a pair of vertically positioned rails, said rails parallel to each other, said counterweight positioned between said rails;
   two wires each connected to the top of said counterweight on a first end and a chain link connector on said T-shaped support bar at the top of said chandelier on a second end, said two wires positioned over a first pair of roller pulleys located directly above said counterweight, said two wires also positioned over a second pair of pulleys located directly above said chandelier, said first pair of pulleys pivotally mounted between said rails, said second pair of pulleys pivotally positioned above said chandelier;
   a spring loaded power cord reel fixedly connected to said second pair of pulleys in between said second pair of pulleys, wherein a power cord unwinds off said reel when said chandelier is lowered and winds onto said reel when said chandelier is raised; and
   a plurality of apertures in said rails, wherein the position of the counterweight can be fixed by placing a pin or lock in one of said apertures thereby preventing the counterweight from sliding up or down between said rails.

7. The device according to claim 6, further comprising a plurality of wall brackets fixedly connected to said rails, said wall brackets comprising apertures for fixedly attaching said plurality of wall brackets to a wall.

* * * * *